Figure 1:
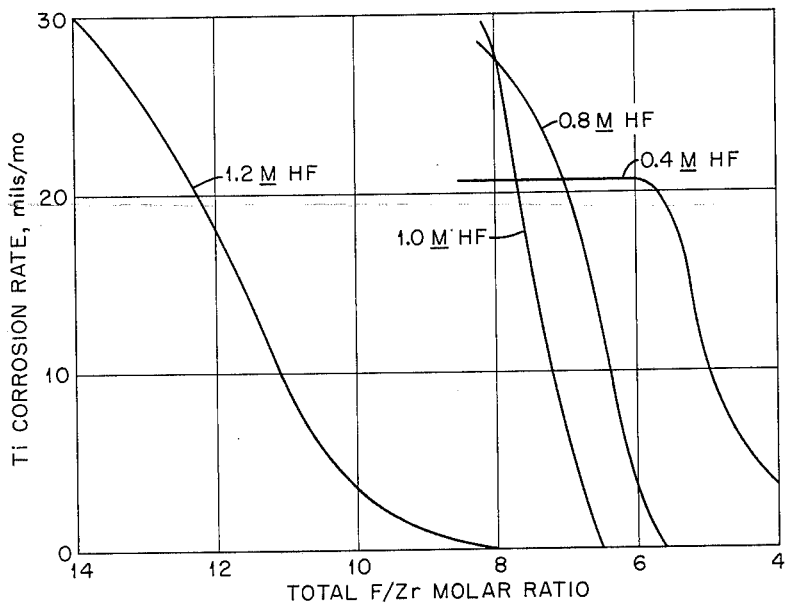

INVENTORS.
Walter E. Clark
Theodore A. Gens

BY

ATTORNEY.

United States Patent Office 3,222,289
Patented Dec. 7, 1965

3,222,289
DISSOLUTION OF ZIRCONIUM IN TITANIUM EQUIPMENT
Walter E. Clark and Theodore A. Gens, Oak Ridge, Tenn., assignors to the United States of America as represented by the United States Atomic Energy Commission
Filed Oct. 5, 1962, Ser. No. 228,775
2 Claims. (Cl. 252—182)

This invention relates to a method of dissolving zirconium in titanium equipment. More particularly it relates to a method of dissolving zirconium in acid fluoride solutions with titanium corrosion inhibitors in titanium equipment.

With the increased use of nuclear reactors there has been a tremendous amount of experimentation with different types of reactor fuels and, correspondingly, an increase in the need for nuclear fuel reprocessing methods. Most reprocessing methods require dissolution of fuel materials in strong acid with subsequent extraction of the desired products from aqueous solution with organic solvents. Titanium metal has been selected as a preferred material for the construction of reprocessing equipment because it is comparatively corrosion resistant to strong acid, and fluoride free solutions. Similarity in the various dissolution processes and the expense of installing new equipment make it desirable to also use titanium equipment for dissolution of other types of reactor fuel materials, such as those containing zirconium and zirconium alloys.

However, any adequate aqueous dissolution of zirconium metal requires the presence of fluoride ion, which, even in small concentrations, severely corrodes titanium dissolution equipment. Since any useful and inexpensive method of aqueous dissolution of zirconium reactor fuel material requires dissolution in the presence of fluoride ion, corrosion inhibition of titanium equipment is necessary while at the same time maintaining adequate dissolution conditions for the zirconium metal.

It is therefore an object of this invention to provide a method for dissolution of zirconium and zirconium alloys in aqueous solutions using titanium dissolution equipment.

It is a further object of this invention to provide corrosion protection for titanium processing equipment while maintaining dissolution conditions for zirconium materials.

Still another object of this invention is to provide a method of inhibiting corrosion of titanium in the presence of fluoride ion.

Another object of this invention is to provide a method of dissolving zirconium-containing reactor fuel materials in titanium processing equipment.

Another object of this invention is to provide a means to eliminate expensive duplication of reactor fuel reprocessing equipment.

These and other objects of this invention will become apparent upon reference to the following description and claims.

We have found that in a solution for dissolving zirconium comprising nitric acid and hydrofluoric acid, the presence of soluble boron values and hexavalent chromium ions inhibits the corrosion of titanium while still maintaining a high dissolution rate for zirconium.

In accordance with our discovery, zirconium is dissolved in a titanium vessel in contact with a nitric acid and hydrofluoric acid solution containing titanium corrosion-inhibiting concentrations of soluble boron values and hexavalent chromium ions.

Figure 2:
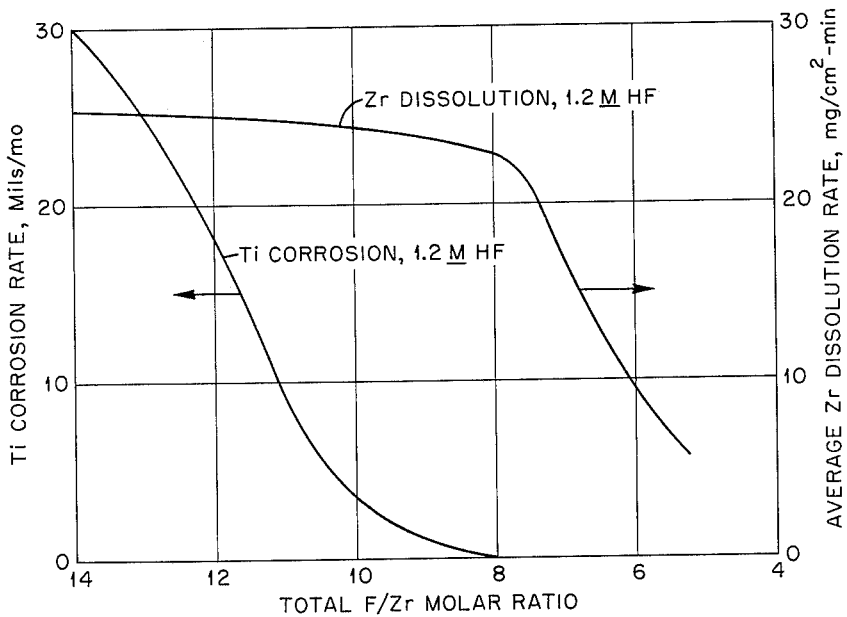

In the drawings,

FIG. 1 represents graphically the effect of varying concentrations of aqueous hydrofluoric acid on titanium corrosion rates in refluxing 3 M $HNO_3$—0.4 M $HBF_4$— 0.4 to 1.0 M Cr(VI) dissolvent as the total F/Zr molar ratio changes; and FIG. 2 represents graphically the effect of 1.2 M hydrofluoric acid on both titanium corrosion rates and zirconium dissolution rates in refluxing 3 M $HNO_3$— 0.4 M $HBF_4$—0.4 to 1.0 M Cr(VI) dissolvent as the total F/Zr molar ratio changes.

For a thorough understanding of the significance of our invention, which involves the simultaneous dissolution of zirconium and corrosion inhibition of titanium, it is necessary to discuss first the dissolution conditions and then the corrosion inhibition under these dissolution conditions.

The dissolution of reactor fuel materials takes place in an aqueous nitric acid solution to ensure dissolution of all the constituents of the fuel material and to provide sufficient nitric acid for subsequent organic solvent extraction of the desired values. The concentration of nitric acid in the dissolvent is not critical, but it has been found that the preferable range is between 2 M and 6 M with 3 M as the optimum concentration of nitric acid. Higher nitric acid concentrations may be used, but are not desirable because excess acid must be removed prior to solvent extraction.

Zirconium concentrations in the solution must be maintained between 0.3 M and 0.5 M. Concentrations in this range provide a high continuous zirconium dissolution rate (above 3 mg./cm.$^2$/min.) and also provide an ideal feed for subsequent solvent extraction. Acid fluoride solutions with less than 0.3 M zirconium require the addition of a fluoride complexing agent such as aluminum and in solutions over 0.5 M zirconium dissolution rates decrease rapidly and a precipitate starts to form. Zirconium concentration of between 0.46 M and 0.47 M is considered optimum for continuous dissolution.

It is known that the dissolution of reactor fuel materials containing zirconium and zirconium alloys, such as Zircaloy alloy, requires fluoride ion, usually in the form of aqueous hydrofluoric acid, and to provide adequate zirconium dissolution conditions it is necessary to maintain a total fluoride to zirconium molar ratio at least at the stoichiometric ratio of 4 to 1. However, for rapid dissolution of zirconium to provide continuous feed for solvent extraction it is necessary to maintain the total fluoride to zirconium molar ratio in excess of 5.5 to 1. This requires a minimum total fluoride concentration of about 1.7 M at the minimum zirconium concentration of 0.3 M. As will be noted later, a preferred upper limit of total F/Zr molar ratio is 10 to 1 where, even in the presence of corrosion inhibitors, titanium corrosion becomes excessive. Uniform titanium corrosion rate over 10 mils/month is deemed excessive for continuous nuclear fuel reprocessing dissolution equipment. To provide an optimum total F/Zr molar ratio of about 6 to 1 in our process, a total fluoride concentration of between 1.8 M and 3.0 M is required. The total fluoride concentration is the sum of the free fluoride ion concentration and the combined fluoride concentration. These concentrations of fluoride ion, of course, are extremely corrosive, in the absence of corrosion inhibitors, to titanium equipment to be used for continuous dissolution of zirconium.

It has been found that the addition of both hexavalent chromium ion and soluble boron values to the nitric-hydrofluoric acid solution significantly inhibits titanium corrosion while at the same time adequate zirconium dissolution conditions are maintained. Although the exact effect of these corrosion inhibitors is not known, the hexavalent chromium ion probably serves to produce a protective oxide coat on titanium, while the boron apparently also forms a protective white fluoborate compound which coats the titanium surface.

Chromium ion may be added in any soluble hexavalent form, such as ammonium dichromate, and since Cr(VI) is reduced to Cr(III) by dissolving zirconium, at least 0.05 M Cr(VI) must be present in the solution to keep corrosion rates low. Usually an excess Cr(VI) concentration in the dissolvent is desirable to protect the titanium equipment in case of malfunction of the reagent addition system. An upper limit of about 0.4 M Cr(VI) is deemed sufficient to provide the desired protection in the dissolution. In the continuous zirconium dissolution, Cr(VI) concentration is monitored and kept at approximately 0.4 M.

Soluble boron values may be added as any soluble boron salt, boric acid, or preferably as fluoboric acid. Boron concentrations must be maintained between 0.2 M and 0.4 M. If boron is added as fluoboric acid it is necessary to only add a slight amount of other fluoride values to bring the concentration of fluoride up to the minimum concentration of 1.7 M. Although boron values increase the F/Zr molar ratio range over which titanium corrosion rates remain below 10 mils/month, concentrations over 0.4 M tend to increase rather than inhibit titanium corrosion and are therefore to be avoided.

The effect of the combined corrosion inhibition of soluble boron values and hexavalent chromium ion is represented in FIG. 1. Varying concentrations of hydrofluoric acid up to 1.2 M are shown. It will be noted that at a hydrofluoric acid concentration of 1.2 M the titanium corrosion rate remains below 10 mils/month at a total F/Zr molar ratio of about 11 to 1. This represents the useful upper limit for the titanium corrosion inhibition using these reagents.

FIG. 2 shows both the zirconium dissolution rate and the titanium corrosion rate in the same refluxing dissolvent as in FIG. 1 with 1.2 M hydrofluoric acid concentration. The zirconium dissolution remains high until the total F/Zr molar ratio is below 5.5 to 1. This figure, of course, represents the operating range for a continuous dissolution of zirconium in titanium equipment in a refluxing dissolvent of 3 M $HNO_3$–0.4 M $HBF_4$–0.4 to 1.0 M Cr(VI) and 1.2 M hydrofluoric acid. This operating range is a total F/Zr molar ratio of from 5.5 to 1 to above 10 to 1.

In the practice of this invention a continuous zirconium dissolution at the rate of 8 to 10 mg./cm.$^2$/min. in a titanium vessel occurs in a nitric-hydrofluoric acid solvent wherein the zirconium concentration is maintained between 0.3 M to 0.5 M, the fluoride to zirconium molar ratio is between 5.5 to 1 and 10 to 1, the hexavalent chromium concentration is at least 0.4 M, and the soluble boron values are maintained in concentrations between 0.2 M and 0.4 M. Generally it is advantageous to maintain the dissolvent temperature for continuous dissolution at the boiling point of the solution or at approximately 105° C. to provide sufficiently rapid dissolution. Also, a lower initial corrosion rate is achieved by pre-exposing the titanium to air and dissolvent to provide a protective film.

The invention may be more readily understood by reference to the following example.

*Example*

Zircaloy-2 alloy was continuously dissolved at 105° C. in a titanium vessel in which the dissolvent was 3 M $HNO_3$, 1.2 M HF, 0.4 M $HBF_4$, 0.6 M Cr(III), 0.4 M Cr(VI) and 0.46 M Zr. Zr concentration of about 0.46 M was maintained by continuously extracting product and by adding Zr with a dissolvent makeup comprising 5.5 M $HNO_3$, 0.4 M $HBF_4$, 0.5 M $(NH_4)_2Cr_2O_7$ and 1.2 M HF. An instantaneous Zr dissolution rate of between 8 and 10 mg./cm$^2$/min. at a titanium corrosion rate of <1 mil/month was achieved. The dissolvent concentration was maintained by monitoring the Cr(VI) concentration and concentration adjustments were made by adding dissolvent makeup.

It will be understood that the above example is merely illustrative and is not intended to limit the scope of our invention, which is limited only as indicated by the appended claims. It is also to be understood that variations in apparatus and procedure may be employed by one skilled in the art without departing from the scope of our invention. Wherever used in the specification and claims the term "M" means molar.

What is claimed is:

1. A method of dissolving zirconium salts in a titanium container system which comprises reacting said zirconium in said system with a zirconium dissolvent consisting essentially of a 2–6 molar aqueous solution of nitric acid containing total fluoride not exceeding 3 molar and a titanium corrosion-inhibiting concentration of (a) soluble boron salts in the range 0.2 M–0.4 molar as well as (b) hexavalent chromium to the extent of at least 0.05 molar.

2. The method of claim 1 in which the zirconium concentration does not exceed 0.5 molar while the F/Zr molar ratio is between 5.5 to 1 and 10 to 1.

References Cited by the Examiner
UNITED STATES PATENTS

| | | | |
|---|---|---|---|
| 2,904,414 | 9/1959 | Ostrander et al. | 252—79.2 XR |
| 2,954,289 | 9/1960 | Sherwood | 134—41 XR |
| 2,977,204 | 3/1961 | Shannon | 254—79.3 XR |
| 3,106,499 | 10/1963 | Kendall | 252—79.3 XR |
| 3,125,474 | 3/1964 | Watkins | 252—79.3 XR |

JULIUS GREENWALD, *Primary Examiner.*